Jan. 1, 1952            A. M. LEWIS            2,581,034
APPARATUS FOR FERMENTING SPONGE DOUGH
Filed Feb. 7, 1946            2 SHEETS—SHEET 1
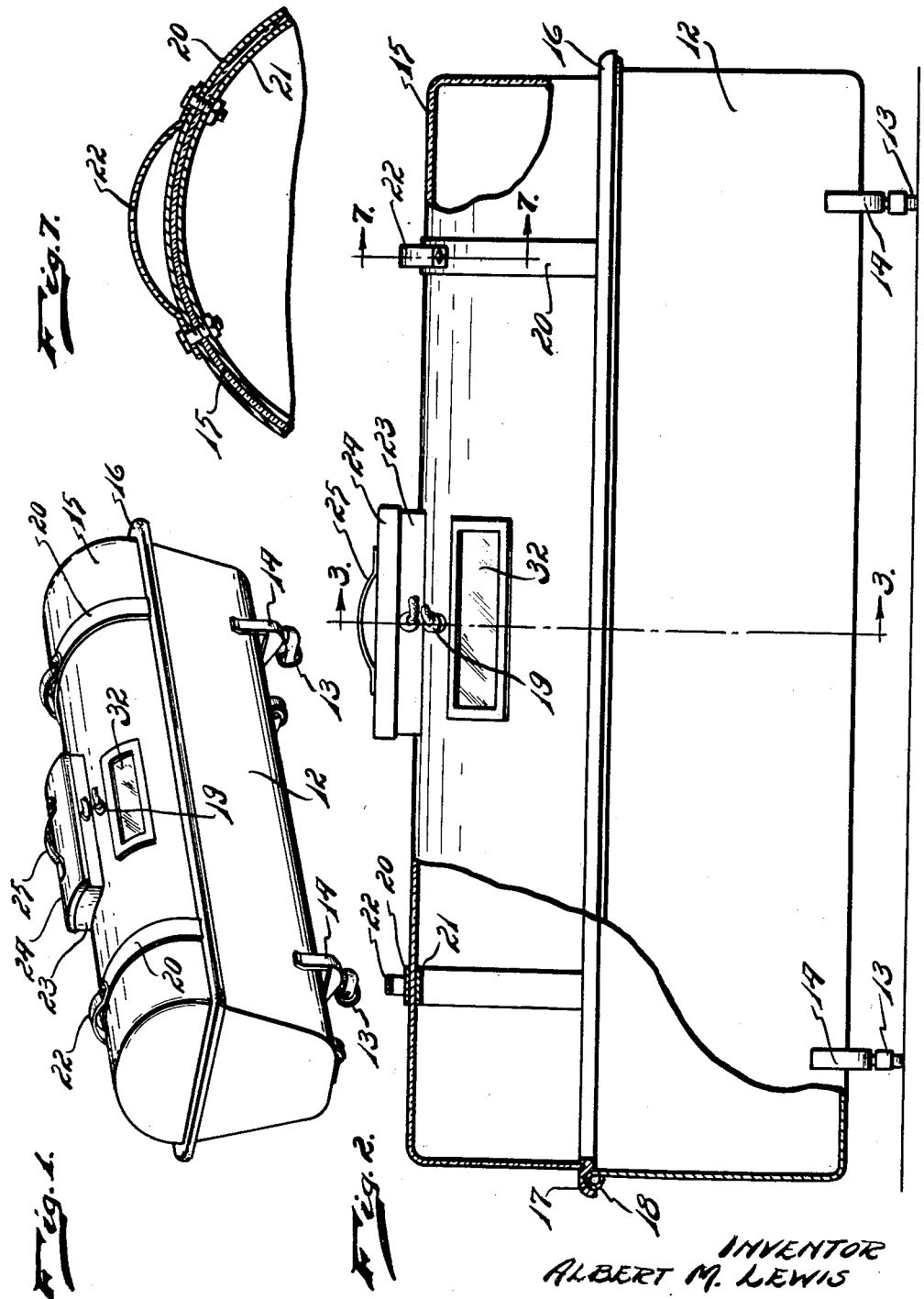
INVENTOR
ALBERT M. LEWIS
BY
ATTORNEY

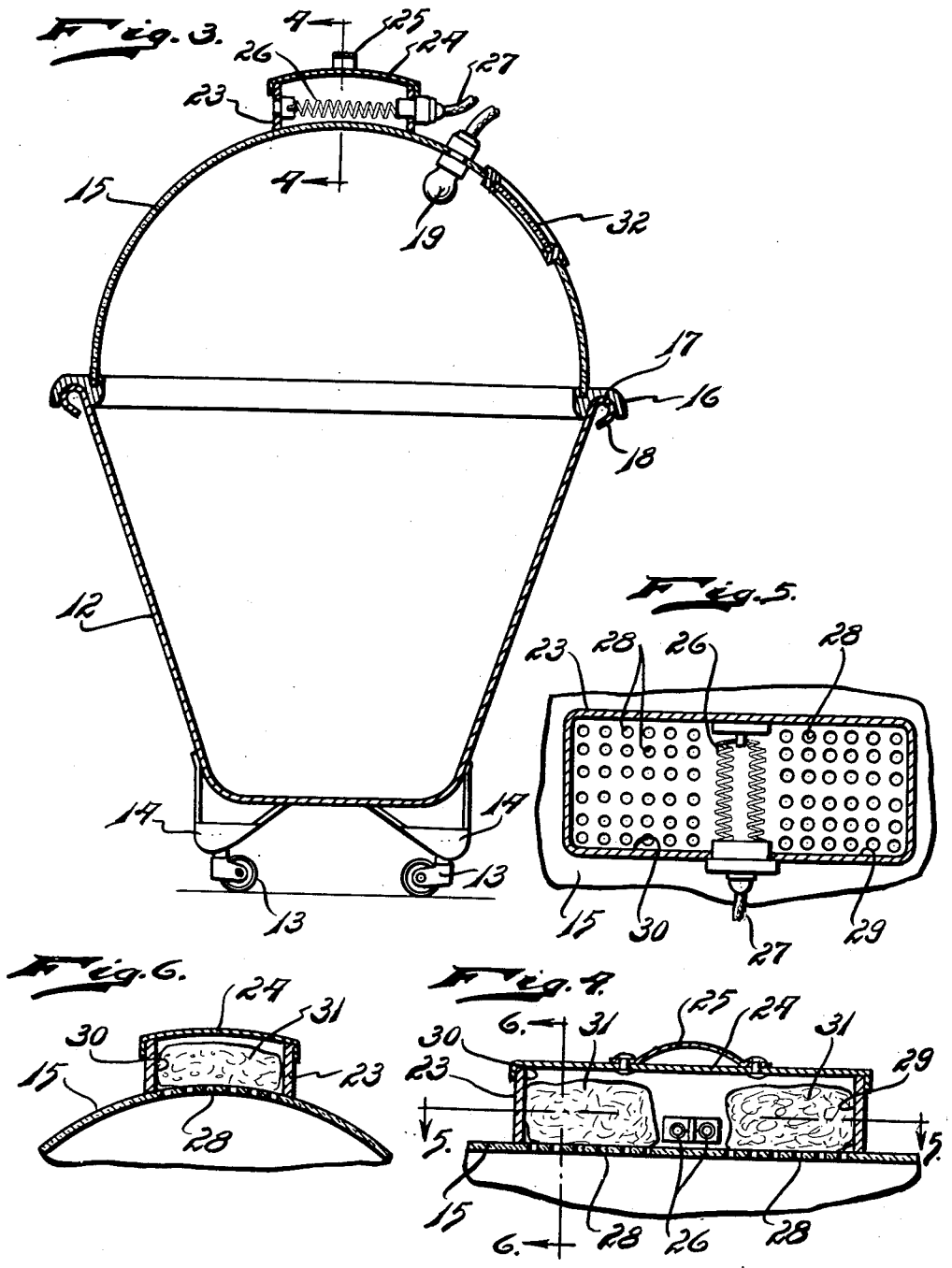

Patented Jan. 1, 1952

2,581,034

UNITED STATES PATENT OFFICE 2,581,034

APPARATUS FOR FERMENTING SPONGE DOUGH

Albert M. Lewis, Detroit, Mich.

Application February 7, 1946, Serial No. 646,029

4 Claims. (Cl. 107—7)

My invention relates to a new and useful improvement in an apparatus for and a method of making sponge dough and relates particularly to the fermenting of the yeast mixture.

At the present time a well known method consists of depositing the prepared product, consisting of flour and yeast, in vats or tubs and retaining them in a humidified and properly ventilated and heated room until the process of fermentation has taken place. This method has many disadvantages, among which are, a necessity of having a room set aside especially for fermenting the prepared product and the maintaining of this room properly humidified and at a predetermined temperature. Another objectionable feature is that the fermentation is frequently allowed to develop beyond the proper stage and the fermented product will over-flow the vats or tubs. It is an object of the present invention to provide an apparatus for and a method of fermenting the prepared product in such a manner that these disadvantages will be avoided.

Another object is the provision of an apparatus and a method of fermenting the prepared product which will serve to eliminate the loss of weight and which will afford an easy method of maintaining the proper humidity so that the sponge dough will not dry out.

Another object of the invention is the provision of an apparatus and a method of this class whereby the necessary fermentation may be carried on in a small space eliminating the necessity of a separate room.

Another object of the invention is the provision of a process for fermenting a sponge dough so that the product will rise higher, be more fluffy, and possess a silky appearance.

Another object of the invention is the provision of a process of fermenting a sponge dough so that the finished product or bread will have a closer texture, a smooth crust, and a more pleasing appearance.

Another object of the invention is the provision of a process and apparatus whereby the fermentation of the sponge dough may be accomplished in a humid atmosphere in a defined temperature.

Other objects will appear hereinafter.

It is recognized that various modifications and changes may be made both in the process and apparatus without departing from the invention itself and it is intended that such shall be embraced within the scope of the claims which form a part hereof.

Forming a part of the specifications are drawings in which,

Fig. 1 is a perspective view of the apparatus used in the invention,

Fig. 2 is a side elevational view of the apparatus used in the invention with parts broken away and parts shown in section, Fig. 3 is a sectional view taken on line 3—3 of Fig. 2, slightly enlarged, Fig. 4 is a fragmentary sectional view taken on line 4—4, Fig. 3, Fig. 5 is a sectional view taken on line 5—5 of Fig. 4, Fig. 6 is a fragmentary sectional view taken on line 6—6, Fig. 4, Fig. 7 is a fragmentary sectional view taken on line 7—7, Fig. 2.

As shown in the drawings I use a container 12 which is mounted on castors 13 projecting downwardly from supporting links 14. A cover 15 is provided for the container having a bead 16 mounted along the edges thereof. This bead 16 is preferably formed from rubber, plastic or other suitable material and is provided with a groove 17 in which engages the rolled edge 18 of the container 12.

Formed in the cover 15 is a window 32 at which is located an electric light 19, so that the contents of the container 12 may be viewed through the window 32 without necessitating the removal of the cover 15.

The cover 15 is provided with the handles 22 which are secured thereto at the location of reinforcing strips 20 and 21.

Formed on the cover 15 is the housing 23 having a cover 24 mounted thereon and provided with a handle 25. Positioned in the housing 23 is an electric heating element 26 connected by the cord 27 to a suitable source of electrical energy. The cover 15 is provided at the location of the housing 23 with a plurality of holes 28 formed therethrough. On opposite sides of the electrical heating element 26 are compartments 29 and 30 in each of which is positioned a marine sponge 31 which is maintained saturated with salt water.

In use, the prepared product is deposited in the container 12. By the prepared product I mean the yeast and flour prepared in the usual manner for making sponge dough. The sponges 31 are saturated in salt water and the cover is placed in position as shown in Fig. 3. The current is turned on to the heating element 26 so as to assist the evaporation of the water content of the sponges 31 and so as to maintain the temperature of the interior of the container 12 constant and at the proper temperature. The vaporized water will pass through the openings 28 into the interior of the container so that the proper humidity is thus obtained. The fermentation is allowed to proceed until the proper stage of fermentation has been reached. The operator can observe this through the window 32.

Experience has shown that when the fermentation is thus effected the sponge dough will rise higher, take on a silky appearance and be considerably more fluffy and also gain in weight. Experience has also shown that the sponge dough ordinarily will not dry out as is the case where it is fermented in an open vat. It will be noted that the container is sealed so that the gases arising from the sponge dough are maintained and the fermentation necessarily takes place in the presence of these gases. Experience has shown that the most desirable temperature to be maintained within the housing for fermentation is 83° F.

What I claim as new is:

1. An apparatus of the class described adapted for use in fermenting un-fermented sponge dough; comprising: a container for the reception of un-fermented sponge dough; a cover for said container projecting upwardly therefrom and engaging at its edges the edges of said container; a sealing element for sealing the edges of said container with said cover for preventing escape of gasses from said container; a housing on said cover; an electric heating element in said housing; and saturated water absorbent material in said housing, said housing being in communication with the interior of said cover.

2. An apparatus for fermenting unfermented sponge dough, comprising: a container for reception of the unfermented sponge dough; a cover for said container extending upwardly from said container to provide a space beneath said cover and serve as a closure for said container; a sealing gasket for sealing said cover and said container together for preventing escape of gases from said container; a housing on said cover, said cover having openings formed therethrough communicating with said housing for establishing communication of said housing with the interior of said cover; a heater for heating said container; and saturated water absorbent material in said housing for supplying humidity to the interior of said cover.

3. An apparatus of the class described adapted for use in fermenting unfermented sponge dough, comprising: a container for the reception of un-fermented sponge dough; a cover for said container projecting upwardly therefrom and engaging at the edges of said container; a sealing gasket for sealing the edges of said container with said cover for preventing escape of gases from said container; a housing on said cover, said housing embodying a top wall and side wall and said cover forming the bottom wall thereof, said cover at the location of said housing having openings formed there-through for establishing communication between the interior of said housing and the interior of said container; a heater for heating the interior of said housing; and saturated water absorbent material in said housing.

4. An apparatus of the class described adapted for use in fermenting sponge dough, comprising: a container for the reception of unfermented sponge dough; a cover for said container projecting upwardly therefrom and engaging at the edges of said container; a sealing gasket for sealing the edges of said container with said cover for preventing escape of gases from said container; a housing on said cover, said housing embodying a top wall and side wall and said cover forming the bottom wall thereof, said cover at the location of said housing having openings formed there-through for establishing communication between the interior of said housing and the interior of said container; a heater for heating the interior of said housing; and saturated water absorbent material in said housing; and a window in said cover through which the interior of said container may be observed.

ALBERT M. LEWIS.

REFERENCES CITED

The following references are of record in the file of this patent:

UNITED STATES PATENTS

| Number | Name | Date |
|---|---|---|
| 430,643 | Hamm | June 24, 1890 |
| 1,036,490 | Hanna | Aug. 20, 1912 |
| 1,133,997 | Nelson | Mar. 30, 1915 |
| 1,325,506 | Burkhardt | Dec. 23, 1919 |
| 1,382,957 | Hatch | June 28, 1921 |
| 1,414,299 | Nagel | Apr. 25, 1922 |
| 1,555,321 | Woodson | Sept. 29, 1925 |
| 1,853,853 | Fleisher | Apr. 12, 1932 |
| 1,858,086 | House | May 10, 1932 |
| 1,922,096 | Jung | Aug. 15, 1933 |
| 1,923,880 | Peterson | Aug. 22, 1933 |

FOREIGN PATENTS

| Number | Country | Date |
|---|---|---|
| 2,774 | Great Britain | Feb. 3, 1898 |
| 417,110 | Great Britain | Sept. 27, 1934 |
| 430,295 | France | Oct. 12, 1911 |